(12) United States Patent
Anderson

(10) Patent No.: US 10,933,939 B2
(45) Date of Patent: Mar. 2, 2021

(54) J-GATE MOTORCYCLE CLUTCH ADAPTOR ASSEMBLIES AND RELATED METHODS AND SYSTEMS

(71) Applicant: Jason Anderson, Farmington, UT (US)

(72) Inventor: Jason Anderson, Farmington, UT (US)

(73) Assignee: Enswell Speed & Fab, LLC, Farmington, UT (US)

( * ) Notice: Subject to any disclaimer, the term of this patent is extended or adjusted under 35 U.S.C. 154(b) by 0 days.

(21) Appl. No.: 16/880,907

(22) Filed: May 21, 2020

(65) Prior Publication Data

US 2020/0385084 A1 Dec. 10, 2020

Related U.S. Application Data

(60) Provisional application No. 62/851,005, filed on May 21, 2019.

(51) Int. Cl.
*B62K 23/06* (2006.01)
(52) U.S. Cl.
CPC .................................... *B62K 23/06* (2013.01)
(58) Field of Classification Search
CPC ......... B62K 23/06; B62K 11/14; F16D 23/12; F16D 2023/126; B62M 25/04
See application file for complete search history.

(56) References Cited

U.S. PATENT DOCUMENTS 7,040,441 B1 * 5/2006 Karaba .................. B62K 11/04
180/205.6

FOREIGN PATENT DOCUMENTS

GB 186843 A * 10/1922 ............ B62M 25/00

* cited by examiner

*Primary Examiner* — Luis A Gonzalez
(74) *Attorney, Agent, or Firm* — Bretton L. Crockett; TechLaw Ventures, PLLC

(57) ABSTRACT

The present disclosure includes J-Gate adaptor assemblies for motorcycle clutch levers and related systems and methods. In one illustrative embodiment, a bracket on a side of a motorcycle serves as fulcrum for a lever rod mounted thereon via a heim joint. A lower end of the rod is attached to a clutch control cable. The rod extends upwardly, through a guide member with a guide channel formed as elongated slot extending in a first direction to a bend portion that extends in another direction to a "rest portion." The rod may be levered in one direction in the guide channel to engage the clutch and in the opposite direction to disengage it. The rod may be held in the "rest" portion of the channel to retain the clutch in a disengaged position. Conversion kits and methods of converting and adapting motorcycles for using these types of assemblies are also included.

20 Claims, 4 Drawing Sheets

J-GATE MOTORCYCLE CLUTCH ADAPTOR ASSEMBLIES AND RELATED METHODS AND SYSTEMS

CROSS-REFERENCE TO RELATED APPLICATION

This application claims the benefit of U.S. Provisional Application No. 62/851,005 filed May 21, 2019, which is hereby incorporated by reference herein in its entirety, including but not limited to those portions that specifically appear hereinafter.

TECHNICAL FIELD

The present disclosure relates to systems and methods for motorcycle clutch levers.

BACKGROUND

Motorcycles typically employ a wet clutch with the clutch riding in the same oil as the transmission. These clutches are usually made up of a stack of alternating plain steel and friction plates. A set of coil springs or a diaphragm spring plate force the plates together when the clutch is engaged. On motorcycles the clutch is generally operated by a hand lever on the left handlebar. No pressure on the lever means that the clutch plates are engaged (driving), while pulling the lever back towards the rider disengages the clutch plates through cable or hydraulic actuation, allowing the rider to shift gears or coast.

A popular theme with customized motorcycles is obtaining a "clean" look by reducing the number of components that are located on the handlebars. In the past, this has included placing a foot operated clutch lever on the left side of the motorcycle, which is commonly known as suicide clutch, as it requires a rider to remove a foot from the ground while stopped to hold the clutch in a disengaged position for operation, making the tipping of the motorcycle on a user more common. Other attempts have simply moved the hand operated clutch lever to a position on a vertical gear shift rod. This simply moves the cluttered appearance to a different location and can be awkward to use.

A hand operated clutch lever assembly for a motorcycle that was easy to use, would keep the clutch disengaged without requiring continual pressure applied by the rider and that had an attractive appearance would be an improvement in the art.

SUMMARY

The present disclosure includes J-Gate adaptor assemblies for motorcycle clutch levers and related systems and methods. In one illustrative embodiment, a bracket on a side of a motorcycle serves as fulcrum for a lever rod mounted thereon via a heim joint. A lower end of the rod may be attached to a clutch control cable. The rod extends upwardly, through a guide channel formed in a guide member. The guide channel may be formed as an elongated slot extending in a first direction to a bend portion that extends in another direction to a "rest portion." In some embodiments, the guide channel may be configured with as a generally "J-shaped" channel. The rod may be levered in one direction in the guide channel to engage the clutch and in the opposite direction to disengage it. The rod may be held in the "rest" portion of the channel to retain the clutch in a disengaged position. Conversion kits and methods of converting and adapting motorcycles for using these types of assemblies are also included.

DESCRIPTION OF THE DRAWINGS

It will be appreciated by those of ordinary skill in the art that the various drawings are for illustrative purposes only. The nature of the present disclosure, as well as other embodiments of the present invention, may be more clearly understood by reference to the following detailed description, to the appended claims, and to the several drawings.

DETAILED DESCRIPTION

The present disclosure relates to apparatus, systems and method for motorcycle clutch lever assemblies and control systems. It will be appreciated by those skilled in the art that the embodiments herein described, while illustrating certain embodiments, are not intended to so limit the disclosure or the scope of the invention. Those skilled in the art will also understand that various combinations or modifications of the embodiments presented herein can be made without departing from the scope of this disclosure. All such alternate embodiments are within the scope of the present invention.

Referring to FIGS. 1A, 1B, 2, and 3, an assembly 10 including a clutch control lever rod 200 and a J-Gate body 100 is depicted. In the depicted embodiment, the components are mounted on a motorcycle M, secured to the frame F of the motorcycle M and/or to the lobes E1 and E2 of the motorcycle engine. It will be appreciated that the particular connection points and support structures may vary to accommodate different models and types of motorcycles.

Assembly 10 includes a guide plate portion 1000, that may be formed as a planar member or a framework, as depicted herein. The guide plate portion 1000 may be attached to upper attachment and support components that secure assembly 10 to the motorcycle M for use. In the depicted embodiment, the assembly 10 has a central support member 1006 that directly attaches to the motorcycle frame F, under the tank between the engine lobes E1 and E2. Two upper support members 1002 and 1004 extend from the front and rear sides, respectively, of the central support portion and are secured to the lobes E1 and E2, respectively of the motorcycle engine. Guide plate 1000 is attached to the two upper support members 1002 and 1004.

Figure 1A:
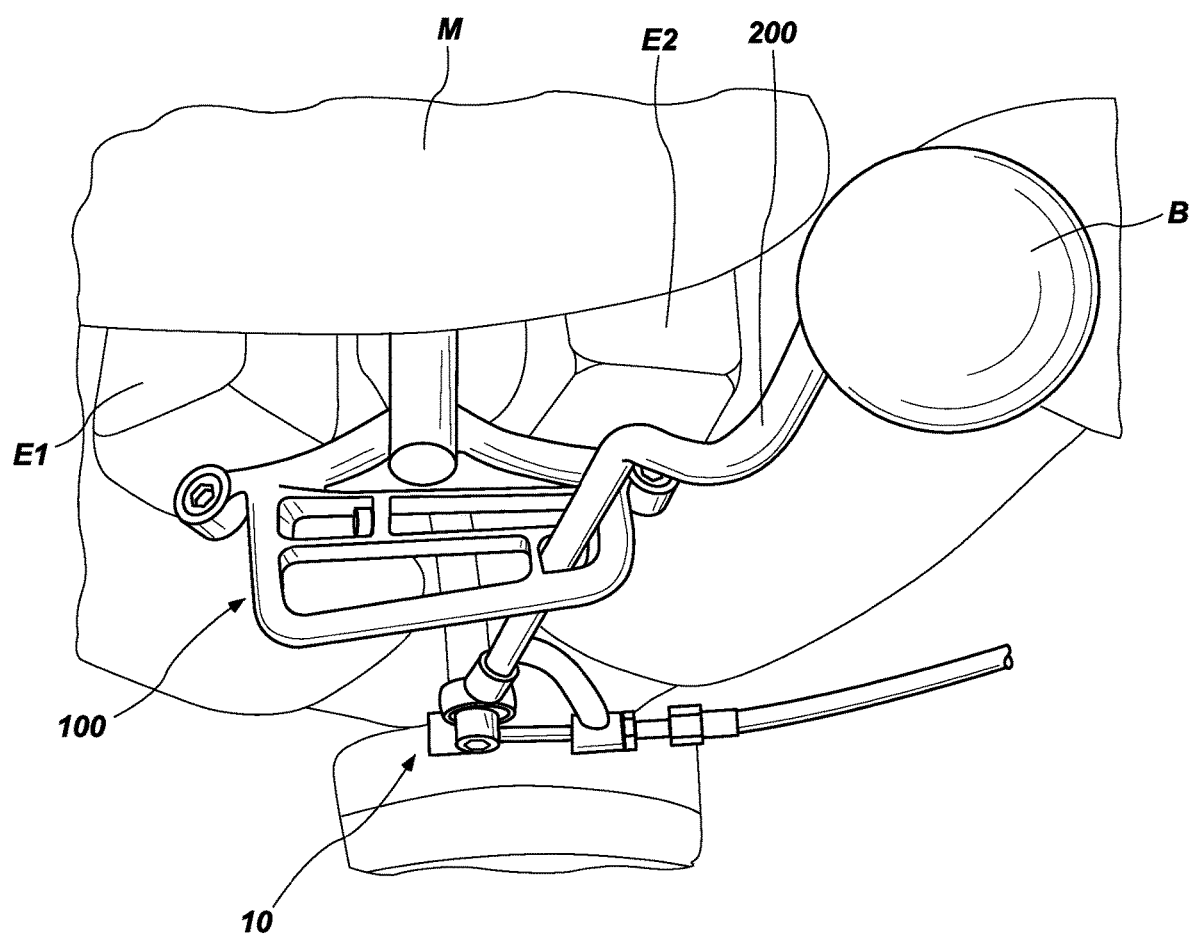
FIGS. 1A and 1B are top perspective views of a J-Gate motorcycle clutch assembly mounted on a motorcycle in accordance with one aspect of the present disclosure, respectively depicted in a retained position and an unretained position.
Figure 1B:
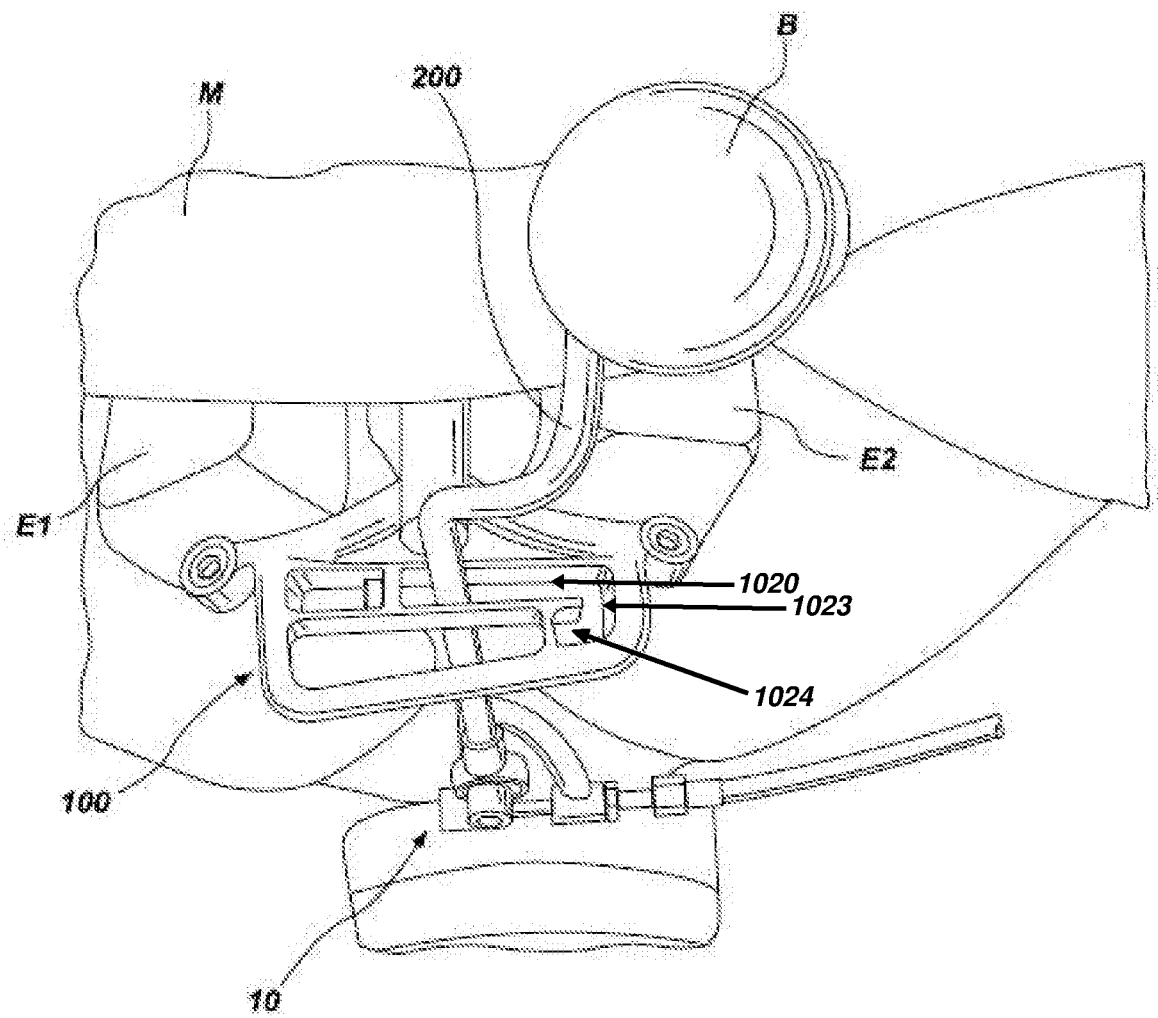
Figure 2:
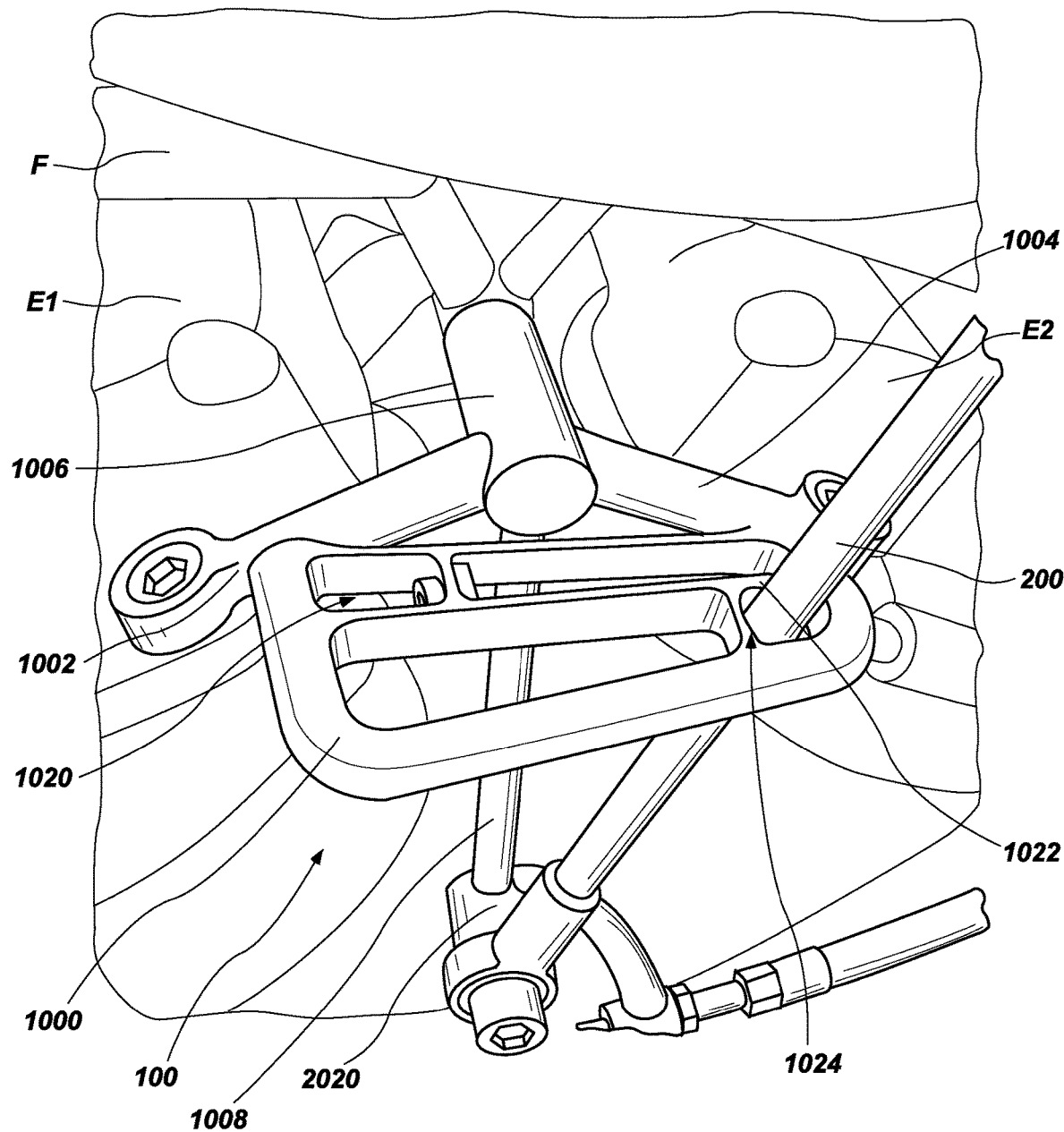
FIG. 2 is an enlarged top side perspective view of the J-Gate guide bracket portion of the assembly of FIG. 1, in position on a motorcycle.

Guide plate 1000 includes a guide channel 1020 formed as an elongated slot extending from a position near a front end of the guide plate 1000 towards the rear end of the plate and including a bend portion 1023 (FIG. 1B) that extends in another direction to a "rest portion" 1024 (which may also be known as a hook portion or retaining portion and is denoted in FIG. 1B) that may be parallel to the main body of the guide channel and separated therefrom by an extending tab member or "hook" 1022. As depicted the hook may extend into, or, separate the bend portion 1023 from the rest portion 1024. In the depicted embodiment, the guide channel 1020, bend, and "rest portion" 1024 are configured to form a generally J-shaped channel, with the "rest portion" 1024 being parallel to the main body of the channel.

Figure 3:
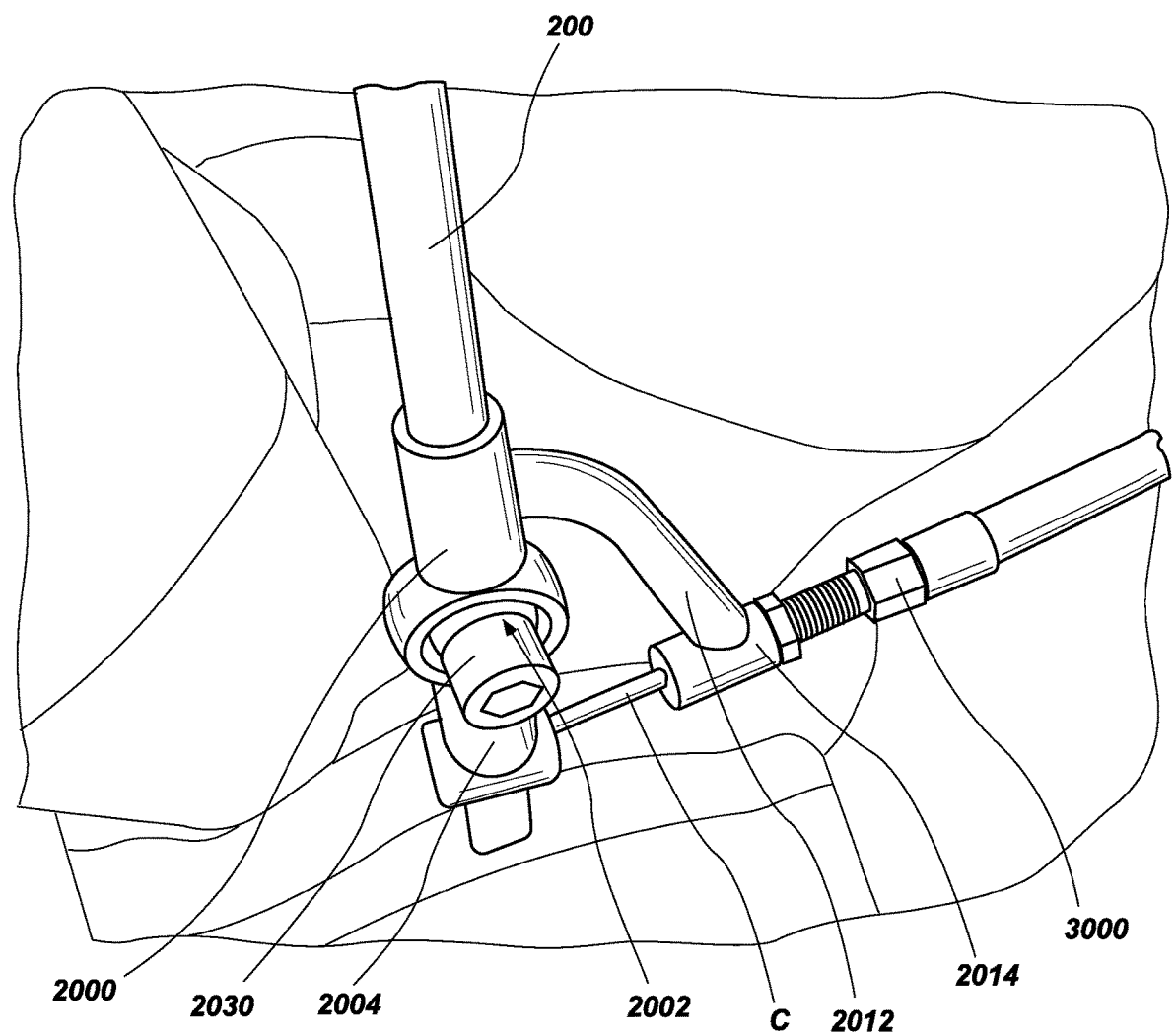
FIG. 3 is a side perspective view the lower portion of the lever rod and clutch cable bracket portions of the assembly of FIGS. 1 and 2, in position on a motorcycle.

A vertical support member 1008 (best depicted in FIG. 2) may extend downwardly from central support member 1006 to a lower bracket 2020 (best depicted in FIG. 3), which may be secured to the motorcycle frame or engine. As best depicted in FIG. 3, lower bracket 2020 may include a cable arm member 2012 that extends rearward and outwards to a cable sleeve attachment structure and cable guide 2014 which are depicted in the illustrative embodiment as a threaded hole for connection to the sleeve and a passage for guiding the cable during use. These allow for connection to the cable sleeve 3000 and positioning of the clutch cable C during use. Additionally, the lower bracket may have a structure, such as a threaded receptacle or stud for placement of the fulcrum bearing 2030 for attachment to the lever rod 200. It will be appreciated that cable arm member 2012 may vary in direction and length in various embodiments as may be advantageous for installation on a particular model of motorcycle or to accommodate movement of a lever rod 200 in different directions for use as discussed further herein.

Assembly 10 may additionally include a lever rod 200 that can be manipulated by a rider to engage and disengage the motorcycle clutch. As depicted, the rod 200 may include an upper handle such as ball B and may include one or more bends in an upper portion to place it in a convenient location for the rider. The shaft of the rod 200 passes through the guide channel 1020 downwards. At a lower end the rod 200 terminates at a cable connector end 2004, which is configured to connect to the end of a clutch cable. In the depicted embodiment this is accomplished by a channel through which the clutch cable C may pass that includes a restricted portion or stop for retaining a member disposed at the end of the cable C, as is known in the art. It will be appreciated that other arrangements for attaching to the cable C may be used.

Above the cable connector end 2004, the rod 200 includes a rod joint portion 2000 which interacts with the fulcrum bearing 2030 for connection. This connection is formed as a heim joint. Socket 2002 may be formed as a ball swivel with an opening through which the fulcrum bearing 2030 connection members pass. The socket may be formed as a circular casing with the rod 200 attached thereto. The ball swivel connection permits the rod 200 to be misaligned to a limited degree to the shaft of the bearing while moving, allowing the levering motion of the shaft thereon.

In use, a rider moves the upper end of the rod 200 forwards in the guide channel, moving the lower end of the rod 200 rearwards and releasing pressure on the clutch cable C to engage the clutch (as best depicted in FIG. 1B). To disengage the clutch, the rider moves the upper end of the rod 200 rearwards, causing the lower end 2004 to pull on the cable C and disengage the clutch. The heim joint connection allows the rod 200 to be moved to the side and around the bend 1023 in the channel and into the rest portion 1024. Tension on the rod from the cable C and the hook member 1022 retain the rod in position with the clutch disengaged (as best depicted in FIG. 1A). This allows a rider to keep both feet on the ground to support the motorcycle when stopped. To engage the clutch, the handle B may be pulled rearward to move the rod 200 upper portion out of the channel rest portion 1024, back through the bend and then forwards to release the tension on the clutch cable C.

The frame, guide plate, rod and bearing members may all be constructed of suitable materials, for example steel or other metal members that are welded together. It will be appreciated that the shape of any particular member may be rounded or square as desired for a particular appearance or as may be suitable for a particular installation.

On advantage of the present design is that the cable sleeve 300 and clutch cable C may require very minimal alteration from the standard positions on a motorcycle, where the clutch cable C typically runs from a position on the clutch around the rear of the engine to the left side to connect to a standard clutch lever on the left handlebar. A shortening of the cable C may be the only change required to connect to an assembly in accordance with the present disclosure. It will be appreciated that the assembly 10 could be offered as a conversion kits and the clutch control of a motorcycle converted to a hand operated side mounted lever or J-gate lever by installation of the same. Such a kit may include suitable instructions and the components discussed herein and may vary depending on the model of motorcycle for which it is intended.

It will be appreciated that while the illustrative embodiment depicted herein has the J-Gate lever assembly disposed on the left side of a motorcycle, that embodiments where the assembly is disposed on the right hand side of the motorcycle are also within the scope of the present disclosure. Additionally, although the guide channel is referred to as having a generally "J" shaped pathway, that channels with a generally reversed "J" shape or a generally "L" shape with a suitable hook member or rest portion may also be used. Additionally, embodiments the movement of the shaft in rearwards to engage and forward to disengage, or where the assembly is disposed so the rod is levered in a direction other than generally parallel to a long axis of the motorcycle are contemplated. For example, embodiments where the lever is moved outwards from and back towards the body of the motorcycle may also be used. Any directional movement may be contemplated so long as movement in a first direction causes levering to place tension on the clutch cable and in the second direction reduces the tension such that movement causes the clutch to engage and disengage.

While this disclosure has been described using certain embodiments, the present disclosure can be further modified while keeping within its spirit and scope. This application is therefore intended to cover any variations, uses, or adaptations of the disclosure using its general principles. Further, this application is intended to cover such departures from the present disclosure as come within known or customary practices in the art to which this invention pertains and which fall within the limits of the appended claims.

What is claimed is:

1. A gated lever motorcycle clutch control assembly on a motorcycle, comprising:
   a bracket attached to the motorcycle;
   a lever rod mounted on the bracket by a heim joint, with a lower end of the rod attached to a clutch control cable; and
   a guide member attached to the motorcycle at a position above the heim joint such that the lever rod extends through a guide channel in the guide member, wherein the guide channel comprises an elongated slot passing through the guide member and having a first longitudinal axis and is continuous with a bend portion of the guide channel which has a second longitudinal axis extending in a different direction than the first longitudinal axis and extends to a rest portion of the guide channel.

2. The assembly of claim 1, wherein movement of an upper end of the lever rod in first direction in the guide channel causes the lower end of the lever rod to move in a second direction and movement of the upper end of the lever rod in the second direction causes the lower end of the lever rod to move in the first direction.

3. The assembly of claim 2, wherein movement of the lower end of the lever rod in the second direction reduces tension on the clutch control cable and movement of the lower end of the lever rod in the first direction increases tension on the clutch control cable.

4. The assembly of claim 1, wherein the rest portion of the guide channel defines a third longitudinal axis extending in a different direction than the second longitudinal axis.

5. The assembly of claim 4, wherein the guide channel has a generally J-shaped configuration formed by the elongated slot of the guide channel, the bend portion of the guide channel and the rest portion of the guide channel.

6. The assembly of claim 4, wherein the rest portion of the guide channel extends through the guide member at a position away from the motorcycle.

7. The assembly of claim 1, further comprising a retaining member extending from a body of the guide member into the guide channel to separate the bend portion of the guide channel and the rest portion of the guide channel.

8. The assembly of claim 7, wherein the lever rod may be retained in the rest portion of the guide channel by the retaining member.

9. The assembly of claim 8, wherein the retaining member is configured as a hook.

10. The assembly of claim 1, wherein the heim joint comprises a fulcrum bearing attached to the bracket and a ball shaped receiver socket disposed on the lever rod, which is disposed on the fulcrum bearing.

11. The assembly of claim 1, further comprising a cable arm member extending from the bracket to a cable guide structure for positioning a sleeve in which the clutch control cable extends.

12. A gated lever clutch control assembly for use with a motorcycle, comprising:
  a bracket for attachment to a motorcycle at a first position;
  a lever rod which is configured to be mounted on the bracket by a heim joint, such that a lower end of the rod may be attached to a clutch control cable of the motorcycle; and
  a guide member for attachment to the motorcycle at a second position, such that upon assembly, the lever rod will extend from the heim joint through a guide channel in the guide member, wherein the guide channel comprises an elongated slot passing through the guide member which has a first longitudinal axis and is continuous with a bend portion of the guide channel, wherein the bend portion of the guide channel has a second longitudinal axis which extends in a different direction than the first longitudinal axis and extends to a rest portion of the guide channel.

13. The assembly of claim 12, wherein upon installation, movement of an upper end of the lever rod in first direction in the guide channel causes the lower end of the lever rod to move in a second direction and movement of the upper end of the lever rod in the second direction causes the lower end of the lever rod to move in the first direction.

14. The assembly of claim 12, wherein the rest portion of the guide channel defines a third longitudinal axis extending in a different direction than the second longitudinal axis.

15. The assembly of claim 14, wherein the guide channel has a generally J-shaped configuration formed by the elongated slot of the guide channel, the bend portion of the guide channel and the rest portion of the guide channel.

16. The assembly of claim 14, wherein the rest portion of the guide channel extends through the guide member at a position away from the motorcycle when installed.

17. The assembly of claim 12, further comprising a retaining member extending from a body of the guide member into the guide channel to separate the bend portion of the guide channel and the rest portion of the guide channel.

18. The assembly of claim 17, wherein the lever rod may be retained in the rest portion of the guide channel by the retaining member.

19. The assembly of claim 12, wherein the heim joint comprises a fulcrum bearing attached to the bracket and a ball shaped receiver socket disposed on the lever rod, which is disposed on the fulcrum bearing for installation.

20. The assembly of claim 1, further comprising a cable arm member extending from the bracket to a cable guide structure for positioning a sleeve in which the clutch control cable extends.

* * * * *